Patented Sept. 2, 1930

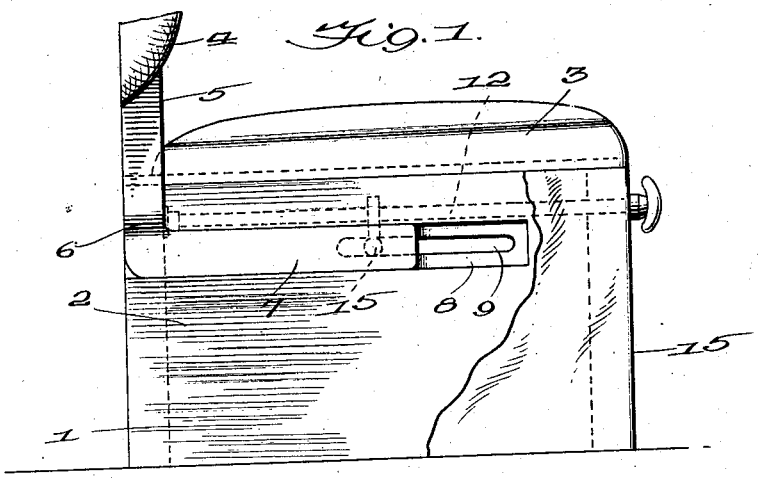
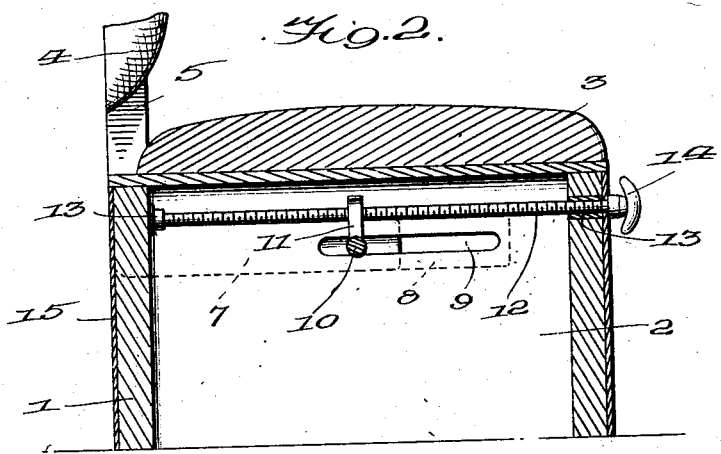
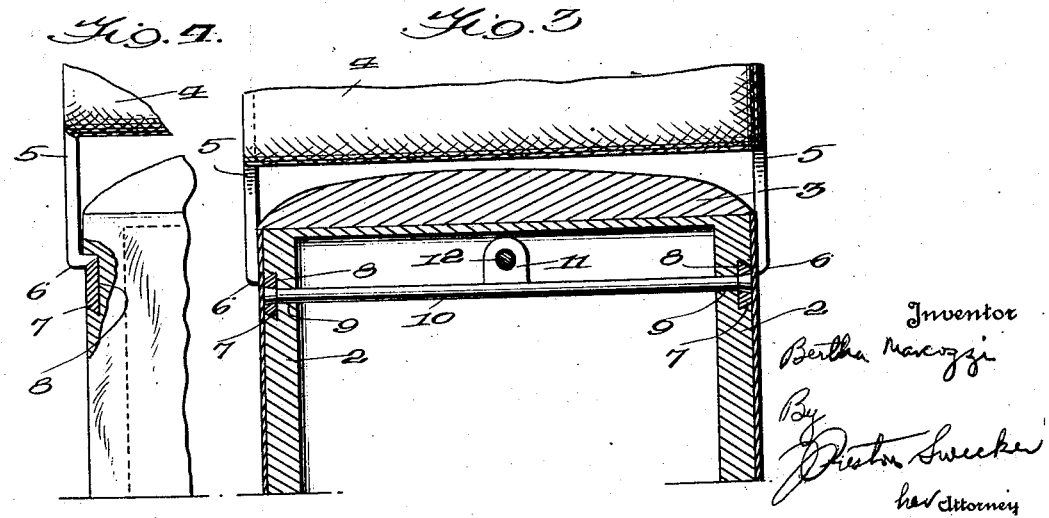

1,774,989

UNITED STATES PATENT OFFICE

BERTHA MARCOZZI, OF WASHINGTON, DISTRICT OF COLUMBIA

ADJUSTABLE SEAT

Application filed February 23, 1929. Serial No. 342,115.

This invention relates to an improvement in adjustable seats.

The object of the invention is to provide an adjustable driving-seat for automobiles, aeroplanes, and similar vehicles, and to simplify the arrangement of the parts, and at the same time rigidly to brace the adjustable back portion of the seat, while permitting of ready adjustment of that back portion relative to the seat portion.

In the accompanying drawings:

Fig. 1 is a side elevation of an adjustable seat showing the invention applied thereto;

Fig. 2 is a sectional view through the same;

Fig. 3 is a similar view at right-angles thereto; and

Fig. 4 is a partial detail sectional view.

The numeral 1 indicates the supporting box structure usually provided for the driver's seat for automobiles, aeroplanes or like vehicles, which is provided with side walls 2, and which box structure supports the fixed or non-adjustable seat portion 3.

The back portion of the seat is designated by the numeral 4, which is provided with opposite frame members 5 extending downwardly on opposite sides of the box structure 1, and likewise of the upholstered seat portion 3 as shown clearly in Figs. 3 and 4. The frame members 5 are turned inwardly toward each other at their lower ends, as at 6, to provide horizontally-extending arms 7, which are disposed approximately out of the plane of the frame portions 5. The arms 7 are received in horizontally-extending dove-tailed grooves 8, formed in the opposite outer sides of the side walls 2 of the supporting box structure, so as to permit of the arms 7 sliding longitudinally of these grooves.

The side walls 2 are also provided with slots 9 in the dove-tailed grooves 8, and through which a rod or bar 10 extends, having its opposite ends fixed to outer portions of the arms 7. This rod or bar 10 is provided with a lug 11, through which a threaded rod 12 extends, said rod being journalled in bearings 13, and having a handle 14 secured to its outer end, preferably externally of the supporting-box structure 1.

The box structure 1 may have the usual sheetmetal casing 15 therearound, if desired, for ornamental effect. Likewise the upholstering of the side and back portions may be arranged as desired.

The arms 7 are formed integrally with the frame members 5, and are slidably mounted in the dove-tailed grooves 8, so that upon turning the handle 14, rotating the screw 12, the rod or bar 10 is moved longitudinally of the slots 9, carrying with it the arms 7, which are fixed to the opposite ends of this rod or bar, which causes an adjustment of the back portion 4 relative to the side portion 3, either forwardly or backwardly. The relation of the frame structure to the seat portion permits of the frame members straddling the box structure, which carries the seat portion, and on opposite sides of it, but by being turned inward toward each other, the forwardly-extending arms may be slidably mounted in the box structure itself, and may extend horizontally to a desired degree. This provides a strong and rigid support for the back portion, and at the same time permits adjustment of the back portion without undersirable contact between the back portion and the fixed seat portion.

The invention may be readily applied to the driver's seat of either automobiles or aeroplanes, or other types of vehicles where it is desirable to have an adjustable driver's seat.

I claim:

1. A seat of the character described comprising a seat portion, and a back portion mounted for movement relative thereto, said back portion having a frame, terminating at its lower portion in forwardly-extending arms, a box structure for supporting the seat portion and provided with grooves on the outer side thereof for slidably receiving the arms, and means for causing sliding movement of said back portion.

2. A seat of the character described comprising a fixed seat portion, and a back portion mounted for movement relative thereto, said back portion having side frame members bent forwardly in approximately L-shape at their lower ends, said forwardly extending portions being offset inwardly toward each other and out of the respective planes of the frame members, a supporting box structure for the seat portion, and having grooves in the opposite outer sides thereof for receiving the forwardly-extending portions, permitting adjustment thereof.

3. A seat of the character described comprising a fixed seat portion, and a back portion mounted for movement relative thereto, said back portion having side frame members bent forwardly in approximately L-shape at their lower ends, said forwardly extending portions being offset inwardly toward each other, and out of the respective planes of the frame members, a supporting box structure for the seat portion, and having grooves in the opposite outer sides thereof for receiving the forwardly-extending portions, permitting adjustment thereof, said box structure having slots formed in the side walls thereof, communicating with the grooves, a bar extending through the slots and fixed to the forwardly-extending portion of the frame, and a screw member operatively connected with said bar for adjusting the back portion.

4. A seat of the character described comprising a seat supporting box structure, a seat portion supported thereby, a back portion mounted for movement relative to the seat portion, frame members fixed to and supporting the back portion, said frame members having approximately horizontally arranged slides fixed thereto, and grooves arranged on the outer sides of the box structure and slidably receiving the slides.

5. A seat of the character described comprising a seat supporting box structure, a seat portion secured thereto, a back portion mounted for movement relative to the seat portion, frame members fixed to and supporting the back portion and straddling the seat portion and the box structure, said frame members having approximately horizontally arranged slides fixed thereto on opposite sides of the box structure, grooves arranged on outer sides of the box structure and slidably receiving the slides, and a rod extending between the slides for bracing and securing the same in place.

In testimony whereof I affix my signature.

BERTHA MARCOZZI.